United States Patent [19]

Bolin

[11] 4,362,953

[45] Dec. 7, 1982

[54] ELECTRONICALLY REGULATED ELECTROMECHANICAL APPLIANCE CONTROL

[75] Inventor: Donald E. Bolin, Franklin, Tenn.

[73] Assignee: The Scott & Fetzer Company, Fairview, Tenn.

[21] Appl. No.: 274,374

[22] Filed: Jun. 17, 1981

[51] Int. Cl.³ .............................................. H01H 43/00
[52] U.S. Cl. .................................................... 307/141
[58] Field of Search .................. 307/141, 141.4, 141.8

[56] References Cited

U.S. PATENT DOCUMENTS

| | | | |
|---|---|---|---|
| 2,703,347 | 3/1955 | Constantine | 200/5 R |
| 3,248,575 | 4/1966 | Bowman | 307/141.4 |
| 3,783,651 | 1/1974 | Karklys | 307/141 X |
| 3,790,815 | 2/1974 | Karklys | 307/141 |
| 4,104,542 | 8/1978 | Karklys et al. | 307/141 |

OTHER PUBLICATIONS

Scott & Fetzer Co. Annual Report 1976, p. 25.
Scott & Fetzer Co. Kingston Division 1977, "Quality Kingston Timers" Pamphlet.
Scott & Fetzer Co. France Div. 1975, The Hybrid Literature.

*Primary Examiner*—Donald A. Griffin
*Attorney, Agent, or Firm*—Pearne, Gordon, Sessions, McCoy & Granger

[57] ABSTRACT

A rotating cam member incrementally moves through a discrete plurality of angular positions to sequentially actuate in a predetermined pattern an array of switches controlling, for example, the operation cycles of a domestic appliance such as an automatic dishwasher or clothes washer. The rotating cam member is driven from one angular position to the next by a motor under the control of a programmable integrated circuit timer determining the dwell time of the cam member at each of its angular positions. Varying the dwell time of the cam member at each of its angular positions readily permits a more flexible and complex operating cycle sequence for the appliance being controlled as compared to prior art electromechanical timer devices.

7 Claims, 2 Drawing Figures

ELECTRONICALLY REGULATED ELECTROMECHANICAL APPLIANCE CONTROL

BACKGROUND OF THE INVENTION

This invention relates in general to the control of domestic appliances such as clothes washers, dishwashers, and the like, and in particular to an electromechanical control regulated by an electronic circuit including an integrated circuit programmable timer.

U.S. Pat. No. 2,703,347 to Constantine discloses a motor-driven control having a fixed array of switches sequentially actuated in predetermined patterns by a cam disc incrementally rotating at a fixed rate to effect the cycling of a domestic appliance, such as an automatic clothes washer or dishwasher, through a predetermined sequence of operations over a predetermined period of time.

The edge of the cam disc is toothed for engagement with a reciprocating pawl element driven by a constant speed motor. Thus, the cam disc is rotatably driven in ratchetlike fashion through a plurality of discrete angular positions at, for example, 6° increments (60 discrete angular positions for each full revolution of the cam disc).

The dwell time of the cam disc (i.e., when the cam disc is at rest) at each of its angular positions is fixed and dependent upon the speed of the drive motor which interfaces with the ratchet action pawl element via a set of reduction gears, the dwell time being that period of time when the pawl element is reciprocating through a lost motion reset movement to engage with the next tooth on the edge of the cam disc. In effect, the constant speed motor, which is often of the synchronous type, acts as a timer to cycle the controlled appliance through desired operations over a period of time necessary, for example, to properly wash a dish or an article of clothing.

Because the dwell time as noted above is fixed, cycle operations requiring a period of time greater than the dwell time of the disc at a single angular position necessarily take up an arcuate sector of the disc in excess of 6°.

For example, the drying cycle of an automatic dishwasher takes a considerable amount of time relative to other cycle operations. Thus, with the drive motor operating continuously, a major arcuate sector of the cam disc is dedicated to the drying cycle, with the associated cam-actuated switch array remaining in a fixed pattern throughout such sector of cam rotation.

It is apparent that the prior art Constantine device discussed above, in combining both a timing function and a control function into a single electromechanical cam-type device, inherently limits the complexity and density of the program that can be fitted onto a cam disc of acceptable size.

U.S. Pat. No. 2,703,347 is herein incorporated in its entirety by reference.

SUMMARY OF THE INVENTION

The present invention includes a drive means and a member rotatably driven by the drive means through a discrete plurality of angular positions, the member dwelling for a period of time at each of its angular positions. The member provides at least one switch-actuating cam surface that engages with at least one cam follower type electrical switch means fixed in position relative to the rotatably driven member, the switch means being movable between conducting and nonconducting positions by engagement with the cam surface. An electronic timer circuit intermittently energizes the drive means to move the rotatably driven member from one angular position to another. The dwell time of the member at one or more of its angular positions is determined by the timer circuit. Preferably, the electronic timer circuit includes a programmable CMOS integrated circuit timer.

A control device manufactured in accordance with the invention offers a high number of complex operation sequences for a controlled apparatus, such as an automatic dishwasher, clothes washer, or the like, since each angular position of the rotatable cam surface providing member can be dedicated to a unique control function, the time for sustaining each control function being dependent not on the rotation rate of the cam surface providing member as taught by the prior art, but rather on the time period between energizations of the drive means as determined by the program of the timing circuit.

BRIEF DESCRIPTION OF THE DRAWINGS

A fuller understanding of the invention may be had by referring to the following description and claims, taken in conjunction with the accompanying drawings, wherein:

DETAILED DESCRIPTION OF THE PREFERRED EMBODIMENT

Figure 1:
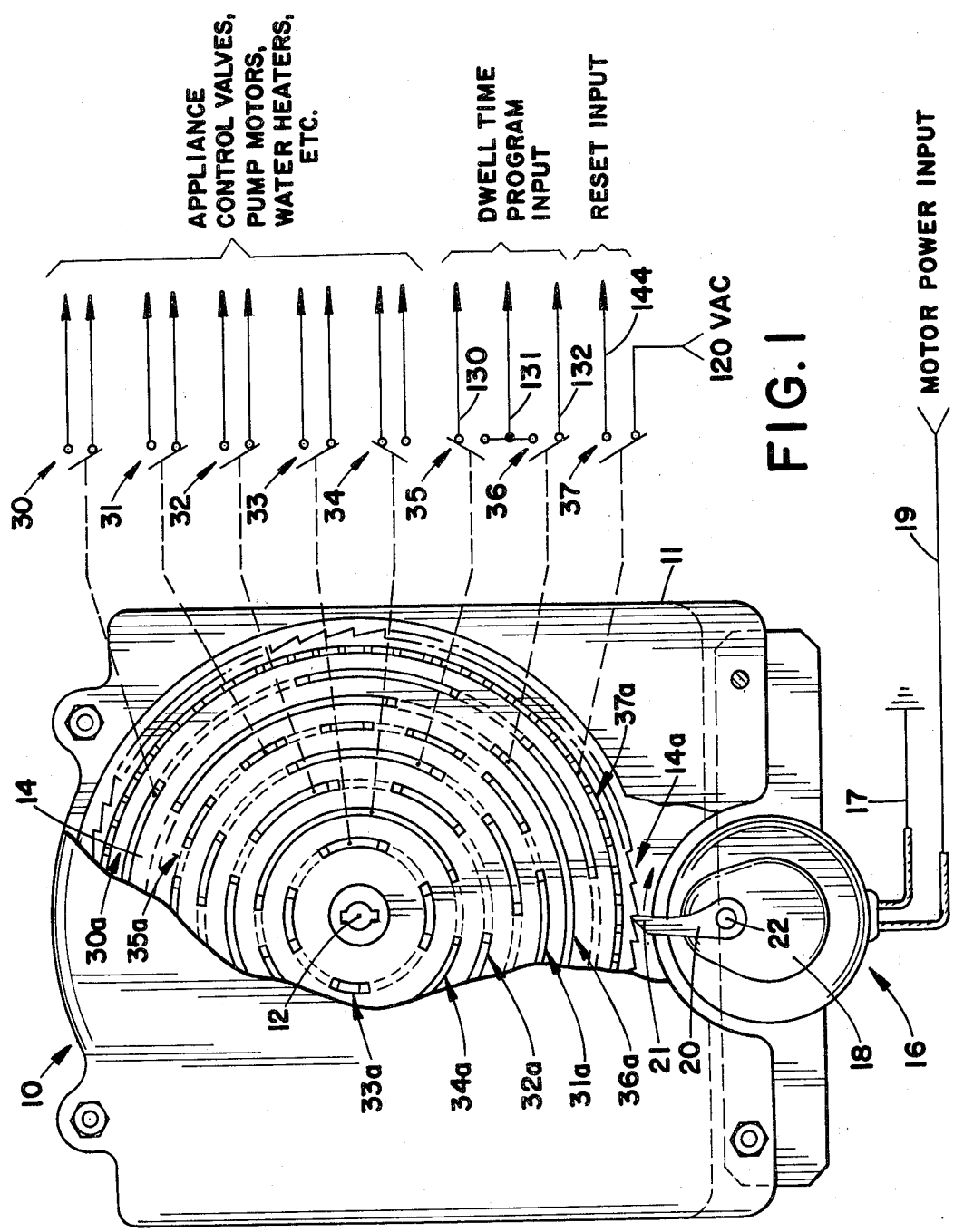
FIG. 1 is a plan view of an electromechanical control with portions cut away.

With reference to FIG. 1, there is illustrated a motor-driven electromechanical appliance control 10 of the general type illustrated by earlier-incorporated Constantine U.S. Pat. No. 2,703,347. The control 10 includes a housing or frame 11 which provides a bearing-like support constituting an axis of rotation 12 for a rotatable cam disc 14 having a toothed edge 14a. A drive means, such as a small, alternating current, fixed speed motor 16, is mounted on the housing 11 and provides, via a conventional gear reducer 18, a rotating drive shaft 22 to which is connected to one end of a pawl member 20 having its distal end 21 engageable (one at a time) with the teeth on the toothed edge 14a of the cam disc 14.

It can be seen that energization of the motor 16 via a pair of power lines 17,19 (power input line 19, neutral or ground line 17) will cause rotation of the pawl element 20 at a fixed rate about its axis of rotation provided by the drive shaft 22 wherein the cam disc 14 is incrementally rotated in a counterclockwise direction (as viewed in FIG. 1) about its axis of rotation 12. By way of example, there are 60 teeth about the edge of the cam disc 14. The disc 14 will rotate in six-degree increments for each revolution of the pawl element 20. It is to be noted that the motor/pawl configuration illustrated is simply an example of one type of drive mechanism that is suitable for practicing the present invention. It is contemplated that a reciprocating ratchet-type mechanism of the type disclosed by the earlier-noted Constantine patent or a solenoid-type device could be utilized in place of the motor/pawl element illustrated in FIG. 1. If the motor 16 were continuously energized, as taught by the prior art, the rate of rotation of the cam disc 14 would be dependent upon the speed of the motor 16. However, this is not the case with the present invention, as will be discussed subsequently with regard to FIG. 2.

A plurality of mechanical switches 30, 31, 32, 33, 34, 35, 36, 37 (illustrated schematically) are fixed in position on and supported by the housing 11 relative to an associated respective plurality of circular cam surface tracks 30a, 31a, 32a, 33a, 34a, 35a, 36a, 37a provided concentrically on at least one side of the disc 14. Each switch includes a cam follower-type element that rides a respective cam surface (at least cam high points) provided on the disc 14, wherein the respective switch is in an opened or closed condition at each of the 60 angular positions provided for the disc. The array of switches 31–37 is opened and closed in a predetermined program pattern as the cam disc 14 incrementally rotates through the 60 available angular positions or a portion thereof. Preferably, both sides of the cam disc 14 include appropriate arrays of switches and circular cam tracks to permit more complex programming for an associated controlled appliance such as a dishwasher or clothes washer. For purposes of simplification, FIG. 1 only illustrates one side of the cam disc. Most of the switches (e.g., switches 30–34) are used to control appliance elements such as fill valves, pump motors, water heaters, and the like during a sequential cycling operation of the appliance, as is known in the prior art.

Figure 2:
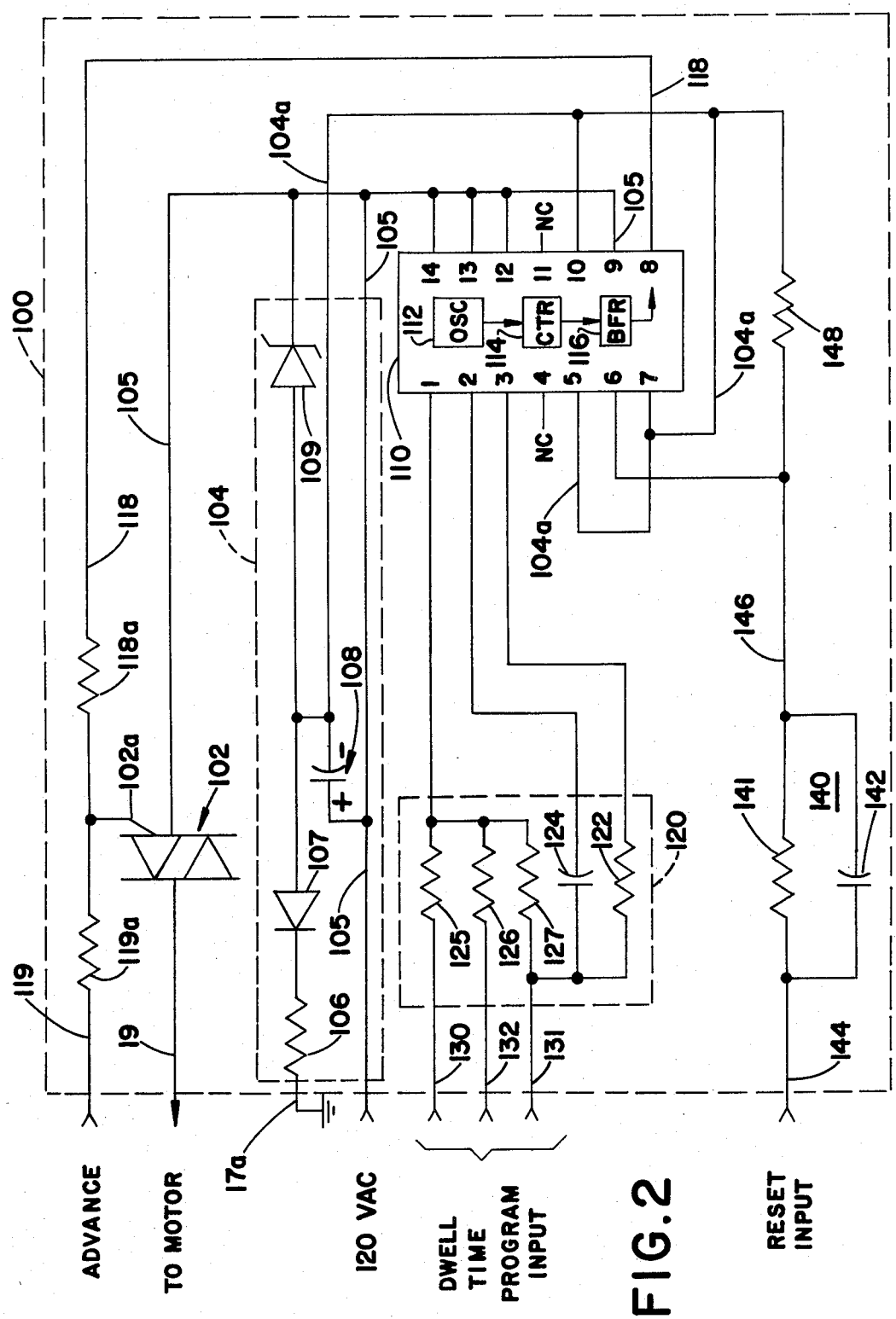
FIG. 2 is a schematic view of a timer circuit, the timer circuit regulating the electromechanical control of FIG. 1 in accordance with the teachings of the present invention.

In accordance with the present invention, the dwell time of the cam disc 14 at each of its 60 angular positions as it incrementally rotates is determined not solely by the speed of the motor 16 or other control monitoring switches (e.g., a liquid level sensor), but rather by an electronic timer circuit 100, as illustrated in FIG. 2. To set up the electronic timer circuit 100 for a desired time-out period, a few of the cam-actuated switches (e.g., switches 35, 36, 37; see FIG. 1) are used to in effect program the electronic timer circuit so as to vary the dwell time of the disc 14 at one angular position relative to other angular positions. Such a feature, for example, will allow the disc 14 to dwell at one position for a long period of time (such as a dish drying interval for a dishwasher) or for a short period of time (such as a rinse agent dispense interval in a dishwasher) depending upon the need of the particular control function desired. Thus, a particular controlled operation (e.g., a drying cycle) need only take up one 6-degree arcuate segment of the cam disc, wherein the other 59 arcuate segments can be used for different control functions.

As illustrated in FIG. 2, the electronic timer circuit 100 includes, for example, an alternating current, gate-controlled thyristor switch 102 such as a Triac ("TRIAC" is a trademark of The General Electric Company, of Syracuse, N.Y.) which is series-connected between a 120-volt a.c. supply line 105 and the power input line 19 connected to energize the motor 16, as illustrated and discussed earlier with regard to FIG. 1.

It can be seen that the switch 102, when energized into a conducting condition, will apply 120 volt a.c. power to the motor to cause rotation of the drive shaft 22 for incremental driving of the cam disc 14. Since the switch 102 is a thyristor type device, it will turn off generally at the zero crossing point of the a.c. supply unless a gate signal is applied and maintained at its gate electrode 102a in accordance with known principles wherein current is either pushed into or pulled out of the gate.

To turn on and turn off the motor 16 via the controlled switch 102, a programmable integrator circuit CMOS timer 110 (Pin Nos. 1–14) is provided. A suitable timer 110 successfully used in practicing the present invention is a type MC 14541B programmable timer manufactured by the Motorola Company, of Phoenix, Ariz. Such a programmable timer 110 includes an integral oscillator 112 having its output provided to an integral counter 114 whose output in turn is provided to an integral buffer 116 for driving an output Pin No. 8 connected to the gate 102a of the thyristor switch 102 via a turn-on line 118 including a current limiting resistor 118a. In a known manner, the oscillator 112 will generate a square wave pulse signal that is counted in binary fashion by the counter 114, which provides an output to the buffer 116 after a predetermined number of counts have been reached. The buffer 116 will then provide a turn-on signal to energize the switch 102 via the turn-on line 118. For example, with the timer 110 connected as illustrated in FIG. 2, a turn-on signal will be generated at Pin No. 8 for every 65,536 pulses ($2^{16}$) generated by the oscillator 112 (assuming the counter 114 is reset for each count, as will be explained subsequently). If the oscillator 112 were kept at a constant frequency, the dwell time of the cam disc 14 (see FIG. 1) at each of its angular positions would be constant and dependent upon the frequency of the oscillator 112. However, in accordance with the present invention, the dwell time of the cam disc 14 at each of its angular positions can be varied by varying the frequency of the oscillator 112, and thus the time that it takes to count the oscillator pulse output, and thus provide a drive signal at Pin No. 8 for energization of the switch 102, and thus the motor 16.

It is known that an integrated circuit timer of the CMOS type as illustrated requires a d.c. supply, such supply being provided in the present invention by a d.c. supply 104. The input to the supply 104 is constituted by the 120-volt a.c. supply line 105 and an associated neutral or ground 17a in common with the neutral or ground line 17 illustrated in FIG. 1. A voltage dividing resistor 106 and a half-wave rectifier diode 107 connected in series with the resistor 106 provide a d.c. charging current to a filter capacitor 108 of the electrolytic type having its positive side connected to the a.c. line 105, its negative side constituting an isolated d.c. ground 104a (i.e., isolated from neutral on ground line 17, 17a). Connected across the capacitor 108 is a voltage regulated Zener diode 109 which establishes a d.c. voltage suitable for operation of the integrated circuit timer 110.

It can be seen that while the a.c. supply line 105 is at a high alternating voltage relative to its neutral or ground line 17a, it is at a low d.c. voltage relative to isolated d.c. ground line 104a. The a.c. supply line 105 is applied to Pin Nos. 14, 13, 12, and 9 of the integrated circuit 110. This applied voltage is in effect equivalent to a logic "1" applied to pins 12 and 13, such application selecting a counter function of $2^{16}$. The isolated d.c. ground on line 104a, constituting a logic "0" is applied to pins 10, 7, and 5. To initiate a count, the integrated circuit 110, when powered up, will be reset by the "1" logic applied at Pin No. 5 (automatic reset). Alternatively, during a power-on condition, a reset voltage (logic "1") is applied to Pin No. 6 (master reset) via reset pulse line 146, in turn connected to a reset switch 37 (see FIG. 1) associated with the cam disc 14. The timer 110 is reset for each 6° increment of cam disc rotation. The actual reset pulse is provided via a pulse generating network 140, including a reset resistor 141 and a reset capacitor 142. A conventional current limiting resistor 148 is connected across Pins 6 to Pins 10 and 7.

With reference to FIG. 1, the cam track 37a provides 60 cam points, equidistantly spaced about the cam disc, one cam high point being associated with each of the 60 teeth along the toothed edge 14a. Thus, for each incremental rotation of the cam disc 14, the switch 37 will open and then close. Such opening and closing will provide a reset pulse to Pin 6 of the integrated circuit timer 10 so as to turn off the output at Pin No. 8 and initiate a new time-out sequence (dwell time) for each angular position of the disc 14.

The operating sequence of the electromechanical control of FIG. 1 as regulated by the electronic timer circuit 100 of FIG. 2 will now be discussed, the frequency of the oscillator 112 being considered constant. Initially, the cam disc 14 is advanced to a start position, either by mechanical rotation or, for example, by a signal applied to the gate 102a via an advance line 119 including a current limiting resistor 119a. Once a start position for the cam disc is established, the switch 102 will be in a nonconducting condition. Assuming that Pin No. 8 is at a high or logic "1" (no gate voltage) condition, the Triac switch 102 will maintain a nonconducting condition. During this period of time, the oscillator pulse output is being counted by the counter 114. When a predetermined count is reached (e.g., $2^{16}$), a signal from the counter via the buffer will cause Pin No. 8 to go low or to a logic "0", wherein, for example, current will be pulled out of the gate electrode 102a to turn on switch 102, and thus power the motor 16, which will rotate to move the cam disc approximately 6 degrees to its next angular position. In so doing, the switch 37 will be open and then will close to apply a reset pulse to Pin No. 6 of the integrated circuit 110, wherein Pin No. 8 will again go high, logic "1", to turn off switch 102 and a new timing sequence will begin. It can be seen that for a constant oscillator frequency, the dwell time of the cam disc 14 in each of its angular positions will be constant. This is undesirable, since an appliance control function requiring more than the fixed dwell time would necessarily take up a plurality of angular positions of the disc.

Thus, in accordance with the present invention, an RC network 120 is provided to vary the frequency of the oscillator 112 from one angular position of the disc 14 to another angular position. Such a function is provided by a set resistor 122 paralleling a time constant determining capacitor 124 connected respectively to Pin Nos. 3 and 2 of the integrated circuit 110, as illustrated. In the preferred embodiment, three program resistors 125, 126, and 127 (having common ends connected to Pin No. 1) can be combined in various parallel combinations, depending upon the position of switches 35, 36 (see FIG. 1), connected to the resistors 125, 126, 127 via first, second, and third frequency select lines 130, 131, 132. As the disc 14 rotates from one angular position to the next, the switches 35, 36 are closed and opened in different patterns, depending upon their respective cam tracks 35a, 36a, to vary the frequency of the oscillator 112, which depends upon the RC time constant established by the capacitor 124 in parallel combination with one or more of the resistors 125, 126, 127. It can be seen that closing of switch 35 and the opening of switch 36 will provide a time constant determined by the parallel combination of capacitor 124 with resistor 125 and 127. In the alternative, switch 35 can be opened and switch 36 can be closed wherein capacitor 124 is paralleled with resistors 126 and 127 to provide a second time constant. Finally, both switches 35 and 36 can be both opened or both closed to provide additional frequencies for the oscillator 112. Thus, for four different frequencies established by the combinations of resistors 125, 126, 127 and capacitor 24, four different time periods can be established for the dwelling of the cam disc 14 at each of its 60 angular positions. It is clear that additional time periods could be provided by additional resistors to the parallel network comprised by resistors 125, 126, and 127.

For example, three time periods of 10 seconds, 75 seconds, and 1,125 seconds have been utilized. In the case of the application of the present invention to the control of a dishwasher, the ten-second time period has been used as a pause between different cycle operations, the 75-second dwell time has been used for fill and drain sequences and the long 1125-second time period has been used for a heat drying sequence for the dishes.

It can be seen that great flexibility and density of programming on the cam disc 14 is provided by separating the timing function from the mechanical power control function advantageously provided by the disc-type electromechanical timer illustrated in FIG. 1. It is also noted that preferably a high count capability ($2^{16}$) of the counter 114 is desirable, since it allows for higher oscillator frequencies, which in turn inherently depend on a small capacitance value for the capacitor 124. Since only a small capacitance value is needed, capacitors of the polystyrene or monolithic ceramic type can be utilized, such capacitor types being more time and temperature stable.

Thus, it can be seen that while the control 10 advantageously functions to regulate appliance operations, the timer circuit 100 regulates the control 10 to determine how long a particular function occurs, thus maximizing the use of program space on the cam disc for a given cycle of operations.

Although a preferred embodiment of the invention has been shown and described, it should be understood that various modifications and rearrangements of the parts may be resorted to without departing from the scope of the invention as disclosed and claimed herein.

What is claimed is:

1. An electromechanical control regulated by an electronic timer, comprising:
    a drive means;
    a member rotatably driven by the drive means through a discrete plurality of angular positions, the member dwelling for a period of time at each of its angular positions, the member providing at least one switch actuating cam surface;
    at least one cam follower type electrical switch means fixed in position relative to the rotatably driven member and engageable with the cam surface, the switch means being movable between conducting and nonconducting positions by engagement with the cam surface; and
    an electronic timer circuit for intermittently energizing the drive means to move the rotatably driven member from one angular position to another, the dwell time of the member at one or more of its angular positions being determined by the timer circuit.

2. An apparatus according to claim 1, wherein the timer circuit includes a counter and a count-generating oscillator, a count being initiated at each of said one or more angular positions of the rotatably driven member, the drive means being energized by the timer to advance the member to the next angular position at the end of a predetermined count.

3. An apparatus according to claim 2, wherein the period of time to reach said predetermined count is varied by altering the frequency of the count-generating oscillator, thus changing the dwell time of the rotatably driven member at one angular position relative to another angular position.

4. An apparatus according to claim 3, including a plurality of resistors and at least one capacitor interconnected in a predetermined network at each of said one or more angular positions of the rotatably driven member, the network being electrically connected to the count-generating oscillator to establish its frequency at each of said one or more angular positions of the rotatably driven member.

5. An electromechanical control regulated by an electronic timer, comprising:

electrically actuated drive means including a movable element;

a disc-shaped cam member rotatable on an axis of rotation, at least one face of the cam member including a plurality of cam surfaces arranged in concentric circles about the axis of the disc-shaped cam member, the outer edge of the disc being toothed;

a pawl means connected between the movable element and the toothed edge of the cam member, the pawl means rotatably driving the cam member in incremental fashion via its toothed edge through a plurality of discrete angular positions, said cam member dwelling for a period of time at each of its angular positions;

a plurality of cam follower type electrical switches fixed in positions relative to the rotatably driven cam member, each switch being engageable with a one of the cam surfaces, each switch means being movable between conducting and nonconducting positions by engagement with its associated cam surface at one or more of said angular positions; and an electronic timer circuit for intermittently energizing the drive means to move the rotatably driven cam member from one angular position to the next, the dwell time of the cam member at each of its angular positions being variable by the electronic timer circuit relative to the dwell time at other angular positions.

6. An apparatus according to claim 5, wherein the electronic timer circuit includes a programmable integrated circuit timer including a variable frequency oscillator having its output connected to a binary counter whose output controls energization and de-energization of the drive means.

7. An apparatus according to claim 6, wherein said integrated circuit is a low power complementary MOS-type device, said apparatus further including a gate-controlled thyristor-type semiconductor switch in electrical series relationship with the drive means, gating of the thyrsitor switch being controlled by said integrated circuit to effect energization and de-energization of the drive means.

* * * * *